United States Patent
Young et al.

(10) Patent No.: US 11,964,197 B2
(45) Date of Patent: Apr. 23, 2024

(54) VIDEO GAME CONTROLLER WITH PERFORMANCE TRACKING

(71) Applicant: Voyetra Turtle Beach Inc., White Plains, NY (US)

(72) Inventors: Andrew Brian Young, Newport (GB); Stephen Thomas Bright, Caldicot (GB); Daniel Adam Nuth, Newport (GB)

(73) Assignee: Voyetra Turtle Beach, Inc., White Plains, NY (US)

( * ) Notice: Subject to any disclaimer, the term of this patent is extended or adjusted under 35 U.S.C. 154(b) by 0 days.

(21) Appl. No.: 17/477,336

(22) Filed: Sep. 16, 2021

(65) Prior Publication Data

US 2023/0083025 A1  Mar. 16, 2023

(51) Int. Cl.
A63F 13/24 (2014.01)
A63F 13/26 (2014.01)
A63F 13/537 (2014.01)

(52) U.S. Cl.
CPC .............. *A63F 13/24* (2014.09); *A63F 13/26* (2014.09); *A63F 13/537* (2014.09)

(58) Field of Classification Search
CPC ......... A63F 13/24; A63F 13/26; A63F 13/537
See application file for complete search history.

(56) References Cited

U.S. PATENT DOCUMENTS

| | | | |
|---|---|---|---|
| 11,547,932 B2 * | 1/2023 | Lea | A63F 13/26 |
| 2004/0023719 A1 * | 2/2004 | Hussaini | A63F 13/92 |
| | | | 463/37 |
| 2005/0227764 A1 * | 10/2005 | Cantu | A63F 13/85 |
| | | | 463/37 |
| 2006/0068917 A1 * | 3/2006 | Snoddy | B60K 6/40 |
| | | | 463/42 |
| 2010/0279769 A1 * | 11/2010 | Kidakam | A63F 13/24 |
| | | | 463/31 |
| 2014/0122708 A1 * | 5/2014 | Bartlett | H04L 41/5009 |
| | | | 709/224 |
| 2014/0221087 A1 * | 8/2014 | Huang | A63F 13/26 |
| | | | 463/31 |
| 2015/0105152 A1 * | 4/2015 | Bellinghausen | A63F 13/2145 |
| | | | 463/31 |
| 2016/0042566 A1 * | 2/2016 | Mao | A63F 13/213 |
| | | | 463/31 |

(Continued)

OTHER PUBLICATIONS

Xbox One SmartGlass: What's New and What's Different. Online. Nov. 19, 2013. Accessed via the Internet. Accessed Aug. 25, 2022. <URL: https://news.xbox.com/en-us/2013/09/06/ent-xbox-one-smartglass/> (Year: 2013).*

(Continued)

*Primary Examiner* — Justin L Myhr
*Assistant Examiner* — Carl V Larsen
(74) *Attorney, Agent, or Firm* — McAndrews, Held & Malloy, Ltd.

(57) ABSTRACT

This disclosure describes a system that allows a user to track performance metrics from a game controller. These performance metrics are displayed on a screen of the game controller. In addition to the game controller, the disclosed system may comprise an app, on a device external from the game controller, that is also able to display the performance metrics as they are updated.

20 Claims, 3 Drawing Sheets

(56) References Cited

U.S. PATENT DOCUMENTS

2017/0286328 A1* 10/2017 Grosse-Puppendahl ..................... G06F 13/4286
2021/0252387 A1* 8/2021 Spofford ............... A63F 13/218
2021/0342020 A1* 11/2021 Jorasch ................... G06F 3/016

OTHER PUBLICATIONS

APM. TechTerms.com. Online. Nov. 4, 2020. Accessed via the Internet. Accessed Feb. 24, 2023. <URL: https://web.archive.org/web/20201104051210/https://techterms.com/definition/apm> (Year: 2020).*

Hoffman, Chris. How to Display Steam's Built-in FPS Counter in PC Games. howtogeek.com. Online. Jan. 17, 2021. Accessed via the Internet. Accessed Jun. 14, 2023. <URL: https://www.howtogeek.com/706145/how-to-display-steams-built-in-fps-counter-in-pc-games/> (Year: 2021).*

Int'l Search Report and Written Opinion Appln No. PCT/US2022/043767 dated Nov. 21, 2022.

* cited by examiner

VIDEO GAME CONTROLLER WITH PERFORMANCE TRACKING

BACKGROUND

Limitations and disadvantages of conventional game controllers will become apparent to one of skill in the art, through comparison of such game controllers with some aspects of the present system set forth in the remainder of this disclosure with reference to the drawings.

BRIEF SUMMARY

A video game controller with performance tracking is provided substantially as illustrated by and/or described in connection with at least one of the figures, as set forth more completely in the claims.

DETAILED DESCRIPTION

This disclosure describes a game controller system that allows a user to access and adapt the features of a game controller as well as secondary actions associated with the gaming experience. The disclosed game controller system may comprise an application ("app"), on a device external from the game controller, that is operable to adjust settings and profiles of the game controller. These settings and profiles are viewable, by the user, from a screen on the game controller. The app may be a PC app, a windows app, or a Mac app. The app may also be a mobile app for a smartphone and/or tablet.

Certain embodiments of the disclosure may be found in a game controller with a user interface. In accordance with various embodiments of the disclosure, a device, such as a smartphone or tablet, may control settings and profiles, used by the game controller, that may be displayed on the user interface of the game controller. The device may adapt and adjust the settings and profiles even while the game controller is being actively used during a game. The device may communicate with the game controller wirelessly via Bluetooth, Wi-Fi, or any other wireless protocol. The game controller, disclosed herein, is not platform-specific and may communicate with a game console wired or wirelessly via Bluetooth, Wi-Fi, or any other wireless protocol.

The disclosed game controller system offers responsive and reliable controls that improve a user's performance. In addition, the disclosed game controller system also delivers innovative applications of technology that improve a user's experience.

Figure 1:
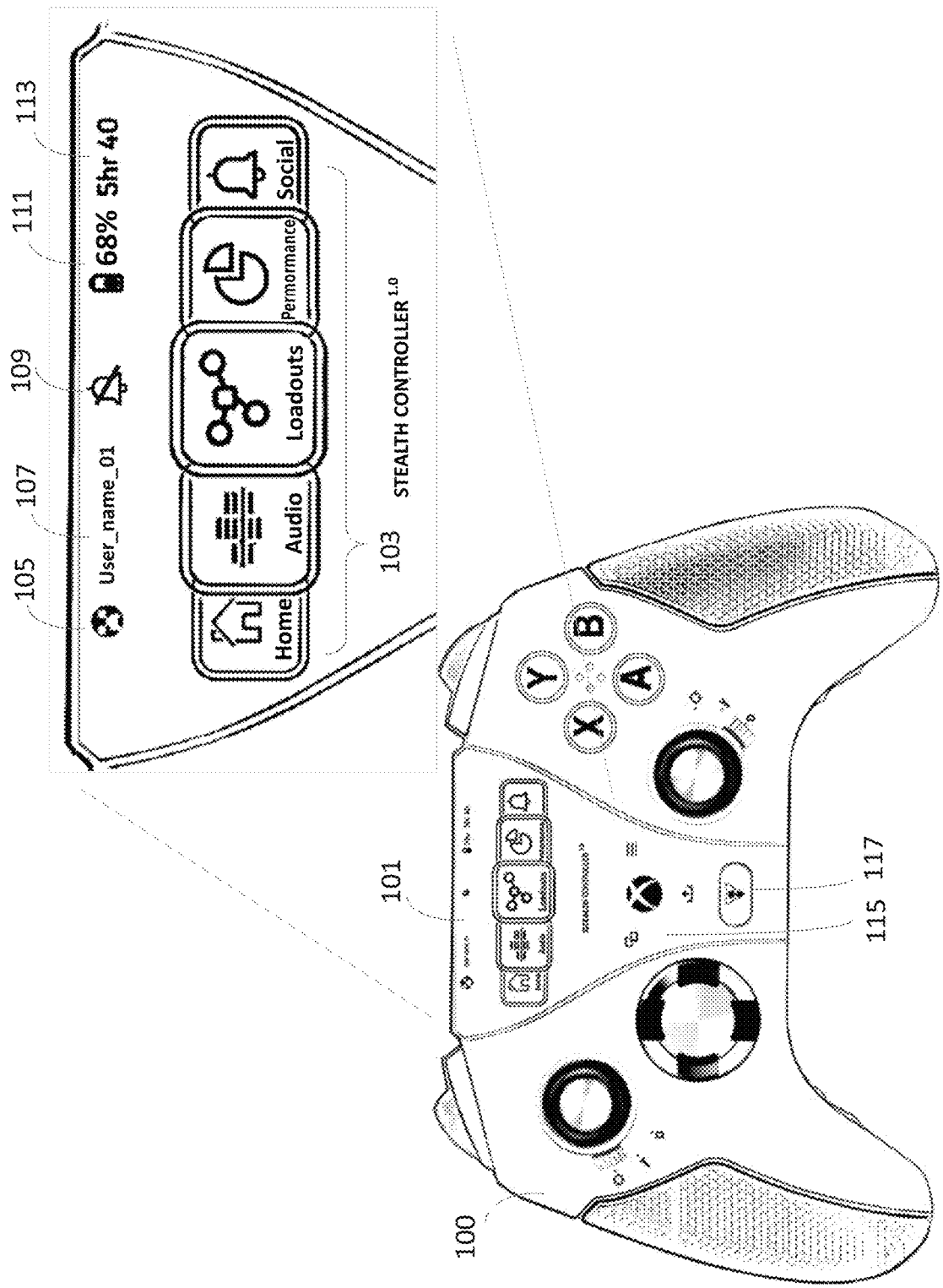
FIG. 1 illustrates an exemplary video game controller with a graphical user interface displaying a menu in accordance with aspects of this disclosure.

FIG. 1 illustrates an exemplary video game controller 100 with a graphical user interface 101 displaying a menu. The game controller 100 is configured to operate a video game and also comprises a memory, a processor and a screen 101. The video game may comprise a PC game, a console game, a mobile game a Mac game or any other electronic game.

The memory in the game controller 100 is configured to store data associated with the game controller 100. The processor in the game controller 100 is configured to access the memory. The screen 101 is operably coupled to the processor and is configured to display the data to the user of the game controller 100. The game controller 100 may comprise a wireless interface that is operable to communicate directly with a video game console. A dongle may be plugged into the video game console to allow the wireless communication. For example, a USB connection on the video game console may be adapted, via the dongle, to communicate with the game controller 100 via Bluetooth, Wi-Fi or any other wireless protocol.

The screen 101 is integrated into the game controller 100. The screen 101 may comprise a graphical user interface and a touch screen. For example, the screen 101 may comprise a capacitive touch display. The screen 101 may also comprise a high resolution display with deep blacks and rich color. The screen 101 may be covered by a tempered glass that may be configured with smooth 3D curves on the edges.

The screen 101 may display programmable settings, profiles, and/or metrics. What and how elements are displayed is adjustable, via the processor, even while the game controller 100 is in use. The display on the screen 101 may provide a quick, in-game access to the settings, profiles, and/or metrics. The game controller 100 may comprises one or more buttons 117 for controlling what is displayed on the screen 101. The game controller 100 may also comprises one or more backlit controls 115.

The graphical user interface 101 in FIG. 1 illustrates a menu of core features 103, a user icon 105, user name 107, a communication setting 109, a battery charge level 111, and an estimate time 113 until a battery must be recharged. This menu is a user-customizable dashboard that can be designed and redesigned by a user as desired for easy access to most frequently used features and to provide an overview of the controller 100 status. For example, an intuitive user interface may allow a user to quickly and easily change settings as desired.

Because the screen 101 is operable to display a customizable, user interface, the user interface may be configured to indicate primary features of the game controller and secondary features/actions of the game experience. The menu carousel 103 may be selectable by touch or the core feature set hubs may be accessed using the button 117. As illustrated in FIG. 1, the core hubs may comprise Home, Loadouts, Audio, Performance and Social. The Performance hub may comprise details on how various buttons on the game controller 100 are being used.

The user icon 105 and user name 107 may be selectable according to who is using the game controller 100 at any given time. The communication setting 109 may toggle between allowing and blocking communication via social media and other communication devices. The processor in the game controller 100 may be operable to control communication from an external device.

The game controller 100 may comprise a rechargeable battery. The battery charge level 111 and the estimate time 113 until a battery must be recharged are useful for indicating when a battery needs to be swapped or recharged. Recharging may be performed via a cable or a dedicated cradle.

Figure 2:
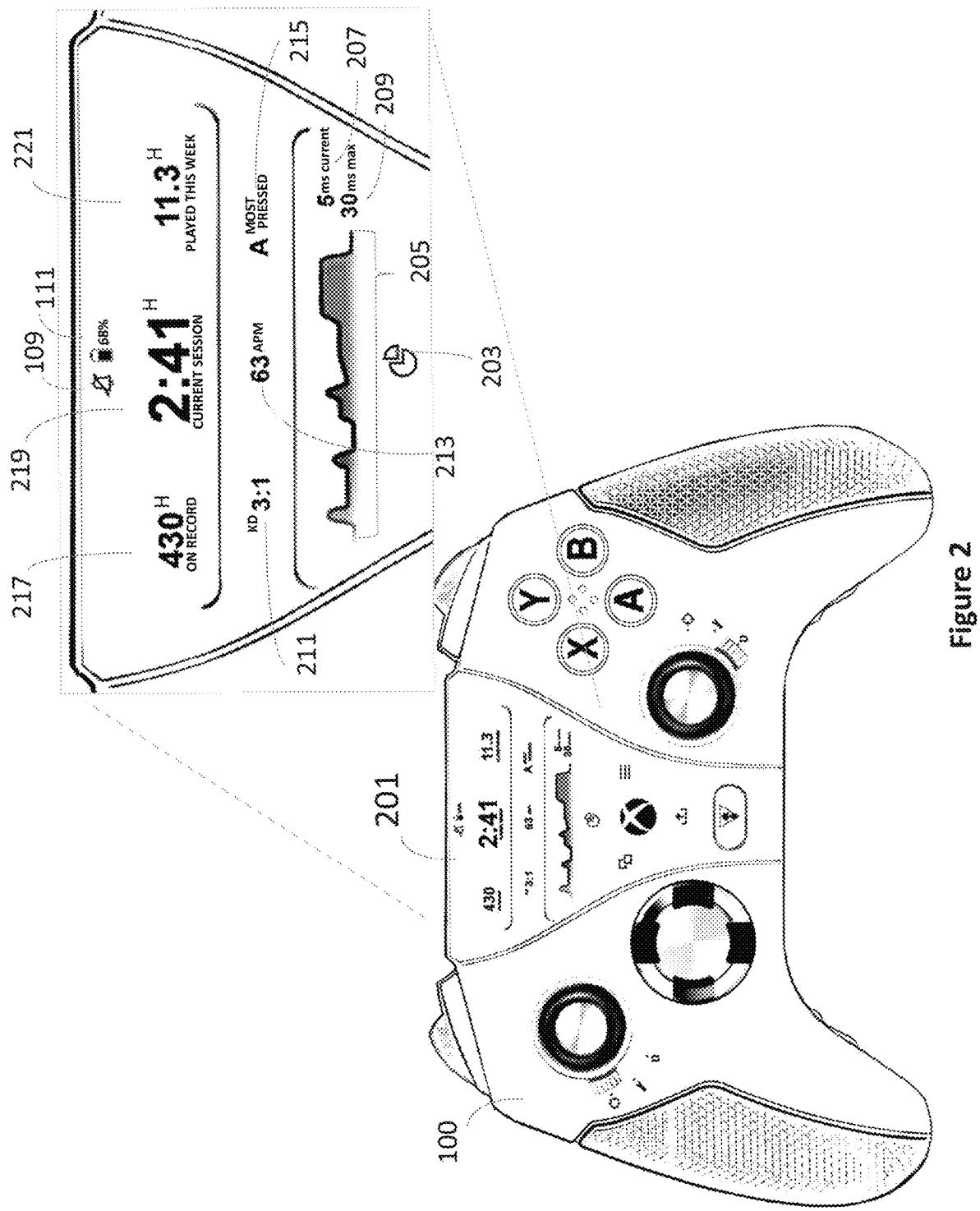
FIG. 2 illustrates an exemplary video game controller with a graphical user interface displaying a performance screen in accordance with aspects of this disclosure.

FIG. 2 illustrates an exemplary video game controller 100 with a graphical user interface displaying a performance screen 201 that is also identified via the performance icon 203.

The performance screen 201 comprises customized screen elements for displaying performance metrics such as a gaming latency chart 205, a current latency 207, a maximum latency 209, a kill to death (KD) ratio 211, an actions per minute (APM) count 213, an indication of the button that pressed most often 215, a total gaming time 217, a current gaming time 219, and a weekly gaming time 219.

Latency (i.e., ping) is a measure of the time it takes to send data to a game server and receive data back again at the game controller. The gaming latency chart 205, current latency 207 and maximum latency 209 provide a real time view of response speed. When a user sees that their latency is increasing, they can take immediate steps to figure out why and improve performance.

The KD ratio 211 defines how many kills a player gets before they die each time they spawn. This metric may be communicated to the game controller 100 by a game console, an external app or by the user themselves.

A performance metric may be determined according to one or more actions performed by a user of the game controller. For example, the APM count 213 may be measured directly by a processor in the game controller 100 that is operably coupled to the controls. The processor may also indicate which game controller button is pressed most often 215.

The performance screen 201 may also comprise the communication setting indicator 109 and the battery charge level indicator 111 as described with reference to the exemplary display 101 in FIG. 1.

Performance analysis for the game controller 100 may be performed via edge and/or cloud computing. Recommendations may be made to highlight where to improve, and how to tweak controller settings to get there. Historic performance reports may be accessed and compared to show improvement over time. Core performance reports may be shown on the screen. The layout of such detailed analysis and insights may be designed, controlled and revealed via an application that runs on the game controller 100 and/or via a mobile application (app) that runs on an external device.

Figure 3:
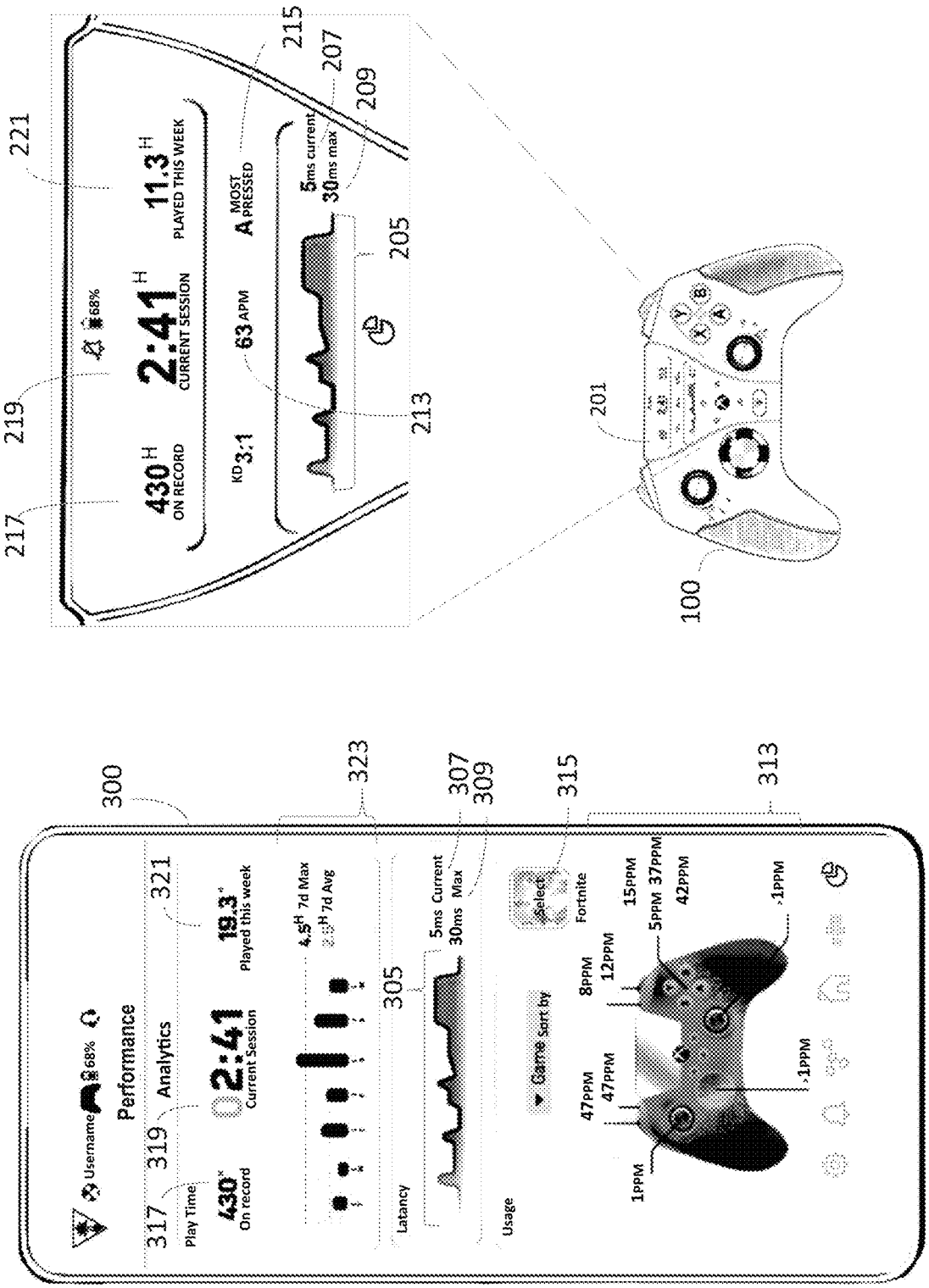
FIG. 3 illustrates an exemplary video game controller and an associated app running on a mobile device in accordance with aspects of this disclosure.

FIG. 3 illustrates an exemplary video game controller 100 and an associated app 300 running on a mobile device. As illustrated, the app 300 on the mobile device is used to configure and dynamically display and control the performance screen 201 on the game controller 100.

An app 300 may be configured to operate on a device external from the game controller 100. The app 300 is operable to adjust the data used by the game controller 100 even while the game controller 100 is in use. The device may be, for example, a smartphone or a tablet. The game controller 100 may comprise a wireless interface that is operable to communicate directly with the device. For example, a particular screen layout design can be created on the companion app 300 and sent to onboard memory of the controller 100. The app 300 may also be enabled to access storage of a cloud service provider and be powered by the cloud. The app 300 may provide full access to the game controller 100 to customize and improve performance.

As illustrated, the app 300 may comprise subsections such as play time, latency and usage. The elements of the app 300 may mirror the performance screen 201. The elements of the app 300 may also provide additional details as desired by the user.

In the play time section of the app 300, a total gaming time 317, a current gaming time 319, and a weekly gaming time 319 mirror the total gaming time 217, the current gaming time 219, and the weekly gaming time 219 shown on the performance screen 201. In addition, the play time section details the gaming time on a day-to-day basis 323.

In the latency section of the app 300, a gaming latency chart 305, a current latency 307 and maximum latency 309 mirror the gaming latency chart 205, the current latency 207 and the maximum latency 209 shown on the performance screen 201.

In the usage section of the app 300, usage may be measured and stored on a per-user basis and/or a per-game basis. For example, the number of button presses per minute (PPM) 313 are displayed for the particular game Fortnite™ 315. This display on the app 300 gives more details about performance, which may not be necessary on the performance screen 201 according to the user's preferences.

While the present system has been described with reference to certain implementations, it will be understood by those skilled in the art that various changes may be made and equivalents may be substituted without departing from the scope of the present system. In addition, many modifications may be made to adapt a particular situation or material to the teachings of the present disclosure without departing from its scope. Therefore, it is intended that the present method and/or system not be limited to the particular implementations disclosed, but that the present system will include all implementations falling within the scope of the appended claims.

Throughout this disclosure, the use of the terms dynamically and/or adaptively with respect to an operation means that, for example, parameters for, configurations for and/or execution of the operation may be configured or reconfigured during run-time (e.g., in, or near, real-time) based on newly received or updated information or data. For example, an operation within a transmitter and/or a receiver may be configured or reconfigured based on, for example, current, recently received and/or updated signals, information and/or data.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise first "circuitry" when executing a first one or more lines of code and may comprise second "circuitry" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A system comprising:
a game controller configured to operate a video game, the game controller comprising:
  a button;
  a memory configured to store a performance metric in the game controller, wherein the performance metric indicates a number of times per minute the button is pressed;
  a processor configured to generate and access the performance metric; and
  a screen, operably coupled to the processor, configured to display the performance metric to a user of the game controller, wherein:
    the video game is not displayed on the screen,
    the performance metric is selectively located in one of a plurality of locations on the screen,
    an ability to selectively locate the performance metric provides an interface layout that is customizable by the user of the game controller,
    the system comprises an application ("app") configured to operate on a device external from the game controller, and
    the app is configured to display an illustration of the game controller and associate the performance metric with a location of the button on the game controller.

2. The system of claim 1, wherein the app is operable to display the performance metric.

3. The system of claim 1, wherein the app is a mobile app and the device is a smartphone.

4. The system of claim 1, wherein the app is a mobile app and the device is a tablet.

5. The system of claim 1, wherein the performance metric is updated while the game controller is in use.

6. The system of claim 1, wherein the processor is configured to measure a gaming latency.

7. The system of claim 1, wherein the performance metric is determined according to one or more actions performed by a user of the game controller.

8. A method comprising:
generating a performance metric according to a number of times per minute a button, on a game controller, is pressed;
storing the performance metric for the game controller in a memory of the game controller;
accessing, via a processor of the game controller, the performance metric stored in the memory; and
displaying the performance metric on a screen of the game controller, wherein:
  a video game is not displayed on the screen,
  the performance metric is selectively located in one of a plurality of locations on the screen,
  an ability to selectively locate the performance metric provides an interface layout that is customizable by a user of the game controller, and
  an application ("app") is configured to operate on a device external from the game controller to display an illustration of the game controller and associate the performance metric with a location of the button on the game controller.

9. The method of claim 8, wherein the method comprises: displaying the performance metric via the app.

10. The method of claim 8, wherein the app is a mobile app and the device is a smartphone.

11. The method of claim 8, wherein the app is a mobile app and the device is a tablet.

12. The method of claim 8, wherein the performance metric is updated while the game controller is in use.

13. The method of claim 8, wherein the method comprises generating, storing and displaying a gaming latency.

14. The method of claim 8, wherein the performance metric is determined according to one or more actions performed by a user of the game controller.

15. A non-transitory computer-readable medium storing a program, wherein when operated by a processor, the program configures a method comprising:
generating and updating a performance metric of a video game controller, and
sending the performance metric to a mobile device, external to the video game controller, wherein:
  the performance metric indicates a number of times per minute a button, on the video game controller, is pressed,
  the performance metric is displayed, on a screen of the game controller, to a user of the video game controller,
  a video game is not displayed on the screen,
  the performance metric is selectively located in one of a plurality of locations on the screen,
  an ability to selectively locate the performance metric provides an interface layout that is customizable by the user of the game controller, and
  the mobile device is configured to display an illustration of the game controller and associate the performance metric with a location of the button on the game controller.

16. The non-transitory computer-readable medium of claim 15, wherein the video game controller comprises the non-transitory computer-readable medium and the processor.

17. The non-transitory computer-readable medium of claim 15, wherein the mobile device, external to the video game controller, comprises the non-transitory computer-readable medium and the processor.

18. The non-transitory computer-readable medium of claim 17, wherein the mobile device is one of a smartphone and a tablet.

19. The non-transitory computer-readable medium of claim 15, wherein the method comprises generating, storing and displaying a gaming latency.

20. The non-transitory computer-readable medium of claim 15, wherein the performance metric is determined according to one or more actions performed by a user of the game controller.

* * * * *